United States Patent Office 2,802,769
Patented Aug. 13, 1957

2,802,769
INSECTICIDES

Frederick G. Van Stryk and Marshall Kulka, Guelph, Ontario, Canada, assignors to United States Rubber Company, New York, N. Y., a corporation of New Jersey No Drawing. Application March 22, 1955,
Serial No. 496,048

5 Claims. (Cl. 167—30)

This invention relates to a new class of chemicals, namely, chlorophenyl-beta-thiocyanoethylsulfides and chlorobenzyl-beta-thiocyanoethylsulfides, as well as to insecticidal compositions based on such chemicals.

The chemicals of the invention are chlorophenyl-beta-thiocyanoethylsulfides, and chlorobenzyl-beta-thiocyanoethylsulfides, as typified by the following p-monochloro compounds:

$$Cl\text{-}C_6H_4\text{-}S\text{-}CH_2CH_2SCN$$

parachlorophenyl-beta-thiocyanoethylsulfide and $$Cl\text{-}C_6H_4\text{-}CH_2\text{-}S\text{-}CH_2CH_2SCN$$

parachlorobenzyl-beta-thiocyanoethylsulfide

The chloro substituent on the benzene nucleus may take any available position, and there may be more than one such chloro substituent, that is, any or all of the available positions on the benzene nucleus may bear a chlorine atom, as represented, for example, by such chlorophenyl compounds as o- or m-monochloro-beta-thiocyanoethylsulfide, 3,4-dichlorophenyl-beta-thiocyanoethylsulfide; 2,5-dichlorophenyl-beta-thiocyanoethylsulfide, 2,4,5-trichlorophenyl-beta-thiocyanoethylsulfide, 2,3,4,5-tetrachlorophenyl-beta-thiocyanoethylsulfide, and pentachlorophenyl-beta-thiocyanoethylsulfide, as well as the corresponding chlorobenzyl compounds, such as ortho- or meta-monochlorobenzyl-beta-thiocyanoethylsulfide, 2,4-dichlorobenzyl-beta-thiocyanoethylsulfide, 3,4-dichlorobenzyl-beta-thiocyanoethylsulfide, 2,4,5-trichlorobenzyl-beta-thiocyanoethylsulfide, 2,3,4,5-tetrachlorobenzyl-beta-thiocyanoethylsulfide, and pentachlorobenzyl-beta-thiocyanoethylsulfide.

The chemicals, particularly the phenyl compounds, may be made from an appropriate chlorobenzenesulfonylchloride (II), such as a mono-, di- or tri-chlorobenzenesulfonylchloride, that is in turn suitably derived from the corresponding sodium salt of the chlorobenzenesulfonic acid (I) and chlorosulfonic acid, according, for example, to the method disclosed in Canadian Patent 483,912 of M. Kulka, as represented by the following equation:

$$Cl\text{-}C_6H_4\text{-}SO_3Na \xrightarrow{HSO_3Cl} Cl\text{-}C_6H_4\text{-}SO_2Cl$$
(I) \hspace{2cm} (II)

Reduction of the sulfonylchloride (II), as with zinc and hydrochloric acid [Ann. 143, 109 (1867)], yields the corresponding chlorothiophenol, according to the equation:

$$Cl\text{-}C_6H_4\text{-}SO_2Cl \xrightarrow[\text{HCl}]{Zn} Cl\text{-}C_6H_4\text{-}SH$$
(II) \hspace{2cm} (III)

The chlorothiophenol (III) may then be converted to chlorophenyl-beta-hydroxyethylsulfide (IV) either by (a) reaction in alkaline solution with ethylenechlorohydrin [J. Chem. Soc., 1933, 46] according to the equation:

$$Cl\text{-}C_6H_4\text{-}SH \xrightarrow[\text{NaOH}]{HO.CH_2.CH_2.Cl} Cl\text{-}C_6H_4\text{-}SCH_2CH_2OH$$
(III) \hspace{2cm} (IV)

or by (b) reaction with ethylene oxide (following the method of Stephenson, J. Chem. Soc., 1954, 1571) according to the equation:

$$Cl\text{-}C_6H_4\text{-}SH + CH_2\text{-}\overset{O}{\underset{}{CH_2}} \xrightarrow{\text{piperidine}}$$
(III)

$$Cl\text{-}C_6H_4\text{-}SCH_2CH_2OH$$
(IV)

A corresponding chloro derivative (V) is then obtained by reacting the chlorophenyl-beta-hydroxyethylsulfide (IV) with phosphorous pentachloride in carbon tetrachloride solution or with thionyl chloride [J. Chem. Soc., 1933, 46] according to the equation:

$$Cl\text{-}C_6H_4\text{-}SCH_2CH_2OH \xrightarrow[\substack{CCl_4 \\ \text{or} \\ SOCl_2}]{PCl_5} Cl\text{-}C_6H_4\text{-}SCH_2CH_2Cl$$
(IV) \hspace{3cm} (V)

In the final step (V) is converted to the desired chlorophenyl-beta-thiocyanoethylsulfide (VI) by refluxing with an excess of ammonium, sodium or potassium thiocyanate in ethanol, methanol or acetone:

$$Cl\text{-}C_6H_4\text{-}SCH_2CH_2Cl \xrightarrow{KSCN} Cl\text{-}C_6H_4\text{-}SCH_2CH_2SCN$$
(V) \hspace{3cm} (VI)

The foregoing method is applicable to the present chlorophenyl class of chemicals in general.

To prepare the chemicals of the described chlorobenzyl class, the appropriate mono- or poly-chlorobenzyl chloride (VII) (or bromide), may be treated with thiourea in ethanol followed by alkaline hydrolysis to yield the chlorobenzyl mercaptan (VIII), thus:

$$Cl\text{-}C_6H_4\text{-}CH_2Cl + CS(NH_2)_2 \xrightarrow[\substack{\text{heat} \\ 2.\ \text{Aqueous} \\ NaOH}]{1.\ C_2H_5OH\ \text{and}}$$
(VII)

$$Cl\text{-}C_6H_4\text{-}CH_2SH$$
(VIII)

Such method was used by Urquhart, Gates and Connor, Organic Syntheses, 21 36 (1941) for the conversion of alkyl halides to alkyl mercaptans, and Lewis and Archer, J. Am. Chem. Soc., 73, 2109 (1951), extended it to the preparation of p-chlorobenzyl mercaptan.

The second step may consist of treating a solution of VIII and ethylene dichloride with sodium methylate. An exothermic reaction results, sodium chloride is precipitated, and the chlorobenzyl-beta-chloromethylsulfide (IX) forms:

$$Cl\text{-}C_6H_4\text{-}CH_2SH + ClCH_2CH_2Cl \xrightarrow{NaOMe}$$
(VIII)

$$Cl\text{-}C_6H_4\text{-}CH_2SCH_2CH_2Cl$$
(IX)

By this method Paterson and du Vigneaud, J. Biol. Chem. 111, 393 (1935) prepared benzyl-beta-chloroethylsulfide. The next step used in the synthesis is not disclosed in the literature, insofar as the present inventors are advised, and involves heating a solution of equimolar quantities of the chlorobenzyl-beta-chloroethylsulfide and sodium, potassium or ammonium thiocyanate in an excess of ethanol under reflux, whereupon the inorganic halide precipitates rapidly and the desired chlorobenzyl-beta-thiocyanoethylsulfide (X) is formed in almost quantitative yield:

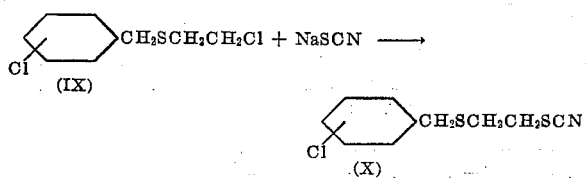

This method is applicable to the present chlorobenzyl class of chemicals in general.

The chemicals of the invention have been found, unexpectedly, to be unusually effective for killing insects. They may be applied directly to plants or other objects on which it is desired to destroy insects or to protect from insects, or they may be applied in an inert medium as a dust or in admixture with a powdered solid carrier, such as the various mineral silicates, e. g. mica, talc, pyrophyllite and clays. They may be applied as aqueous sprays in suspension in water. They may be applied in admixture with small amounts of a surface-active agent which may be an anionic surface-active agent, a non-ionic surface-active agent, or a cationic surface-active agent, and which acts as a wetting agent for the chemical. Such surface-active agents are well known and reference is made to U. S. Patent 2,547,724, columns 3 and 4, for more detailed examples of the same. They are preferably applied as in foliage treatment in an aqueous suspension containing such a surface-active agent as a dispersing agent. The chemicals of the invention may also be admixed with powdered solid carriers, such as mineral silicates, together with a small amount of such a surface-active agent so that a wettable powder may be obtained which may be applied directly to plants, or which may be shaken up with water readily to prepare a suspension of the chemical (and powdered carrier) in water for application to plants or other bodies in that form. The chemicals may also be applied by the aerosol method. The various surface-active agents or powders used in conjunction with the chemicals of the invention may be referred to as insecticidal adjuvants.

The following is illustrative of the preparation of the chemicals of the invention:

EXAMPLE I

*Preparation of p-chlorophenyl-beta thiocyanoethylsulfide*

A solution of 10 parts by weight of p-chlorophenyl-beta-chloroethylsulfide (prepared by known methods, as indicated above) and 10 parts of potassium thiocyanate in 80 parts of ethanol were refluxed for approximately 10 hours. Potassium chloride precipitated. After filtration most of the solvent was taken off in vacuo and cold water was added to the residue. An oil separated from the aqueous layer and became crystalline on scratching. The material was recrystallized from benzene. M. P. 36–38°. Yield: 8.5 parts or 71.0%. Analysis calculated: C=47.06; H=3.48%. Found: C=47.16; H=3.44%. The product has the form of white crystals, insoluble in water, and soluble in acetone and ether (as well as benzene).

EXAMPLE II

*Preparation of 2,5-dichlorophenyl-beta-thiocyanoethylsulfide*

12 parts of 2,5-dichlorophenyl-beta-chloroethylsulfide (prepared by known means as indicated above) were added to a solution of 10 parts potassium thiocyanate in 75 parts of ethanol. The mixture was refluxed for 8 hours. After filtration most of the ethanol was distilled off under reduced pressure and cold water was added to the residue. An oil separated and was washed with water, dried and distilled. B. P. 12 mm./215–220°. Yield: 9.2 parts or 70.5%. Analysis calculated: C=40.91; H=2.65%. Found: C=40.50; H=2.64%. The product was a slightly yellow oily liquid, miscible with acetone, ether, and alcohol.

EXAMPLE III

*Preparation of 3,4-dichlorophenyl-beta-thiocyanoethylsulfide*

6 parts of 3,4-dichlorophenyl-beta-chloroethylsulfide (prepared by known means as indicated above) were added to a solution of 5 parts potassium thiocyanate in 50 parts of ethanol. The mixture was refluxed for 6 hours. After filtration most of the ethanol was distilled off under reduced pressure and cold water was added to the residue. An oil separated and was washed with water, dried and distilled. Yield: 4.8 parts or 75%. B. P. 12 mm./213–216°; M. P. 220° C. Soluble in acetone, alcohol and ether.

EXAMPLE IV

*Preparation of 2,4,5-trichlorophenyl-beta-thiocyanoethylsulfide*

24 parts of 2,4,5-trichlorophenyl-beta-chloroethylsulfide (prepared by known methods) were added to a solution of 30 parts potassium thiocyanate in 200 parts of ethanol. The mixture was refluxed for 12 hours. After filtration most of the ethanol was distilled off under reduced pressure and cold water was added to the residue. An oil separated and was washed with water, dried and distilled. The product crystallized on standing. B. P. 12 mm./225–230°. Yield: 50%; M. P. 26° C., soluble in acetone, ether and alcohol.

EXAMPLE V

*Preparation of chlorobenzyl-beta-chlorethylsulfide*

A solution of p-chlorobenzyl chloride (100 g.), thiourea (50 g.) and ethanol (400 ml.) was heated under reflux for 3 hours. Then a solution of sodium hydroxide (50 g.) in water (200 ml.) was added and the reaction mixture was heated under reflux for 3 hours. Most of the ethanol was distilled off, the residue was acidified and extracted with benzene and the benzene extract was washed with water. The solvent was removed and the residual liquid, which was p-chlorobenzyl mercaptan, was distilled; B. P. (13 mm.)=110°, yield 90%.

To solution of sodium (3.0 g.) in methanol (25 ml.) was added a solution of p-chlorobenzyl mercaptan (22 g.) in ethylene dichloride (100 ml.). When the solution was warmed to about 50° exothermic reaction began. After this subsided the reaction mixture was heated under reflux for one hour, then washed with water and the solvent removed. The residue distilled at 163–164° (12 mm.) yielding 22.5 g. (80%) of p-chlorobenzyl-beta-chloroethylsulfide in the form of a colorless liquid, $n_D^{20}=1.5822$.

By starting with 2,4-dichlorobenzyl chloride and 3,4-dichlorozenzylchloride, respectively, there were prepared in exactly the same manner the corresponding 2,4- and 3,4-dichlorobenzyl-betal-chloroethylsulfides. They boiled at 182–185° C. and 186–189° C., respectively (at 13 mm.).

EXAMPLE VI

*Preparation of chlorobenzyl-beta-thiocyanoethylsulfides*

A solution of p-chlorobenzyl-beta-chloroethylsulfide (9 g.) and sodium thiocyanate (4 g.) in ethanol (120 ml.) was heated under reflux for one hour. The reaction mixture containing the precipitated sodium chloride was diluted with water, extracted with benzene, and the solvent was removed. The residue distilled at 155–158 (1 mm.) as a colorless liquid, yield 9 g., $n_D^{20}=1.6065$.

*2,4- and 3,4-dichlorobenzyl-beta-thiocyanoethylsulfides*

These were prepared exactly as was p-chlorobenzyl-beta-thiocyanoethyl sulfide. They boiled at 158–160 (0.2 mm.) and 165–167 (0.2 mm.) respectively, $n_D^{20}=$ 1.6200 and 1.6240 respectively. The yields were 85% in each case.

The effectiveness of the chemicals of the invention as insecticides is illustrated in the following:

EXAMPLE VII 1 gram of the test chemical is added to 100 cc. of an emulsion comprised of 5 cc. of benzene and 1 gram of an emulsifying agent (i. e., a commercial surface-active dispersing agent, such as the reaction product of castor oil and ethylene oxide known to be non-toxic at the concentrations used to the organism under test), made up to 100 cc. with water. 1 cc. of this test composition is sprayed into the upper part of an enclosed chamber, on the bottom of which a known number of insects—in this case aphids—have been placed. The aphids are afterwards removed and placed within a cage representing a normal environment, and after a definite period of time has elapsed the number of living aphids is determined. Typical results obtained in this manner using the chemicals of the invention on *Macrosiphum pisi* and *Aphis fabae* were as follows:

|  | Percent Mortality | |
|---|---|---|
|  | M. pisi | A. fabae |
| 3,4-dichlorophenyl-beta-thiocyanoethylsulfide | 10 | 82 |
| 2,5-dichlorophenyl-beta-thiocyanoethylsulfide | 43 | 75 |
| 2,4,5-trichlorophenyl-beta-thiocyanoethylsulfide | 50 | 100 |

The foregoing mortality figures represent unusual effectiveness against aphids, which are particularly difficult to kill, in comparison to the results obtained with previously known aphicides. Similar good results were obtained with lower concentrations of the chemicals of the invention. Thus, varying concentrations of para-chlorophenyl-beta-thiocyanoethylsulfide in a test similar to the foregoing gave the following results (the mortality count being made 48 hours after the spraying):

| Percent Mortality | Concentration, percent | | | | | | | |
|---|---|---|---|---|---|---|---|---|
|  | 0.11 | 0.25 | 0.33 | 0.40 | 0.50 | 0.66 | 0.80 | 1.00 |
| M. pisi | 13 | 39 | 55 | 69 | 61 | 100 | 100 | 100 |
| A. fabae | 19 | 51 | 57 | 69 | 73 | 100 | 100 | 100 |

This chemical produced a mortality of 50% at a concentration of 0.32% on *M. pisi* and at a concentration of 0.25% on *A. fabae*, indicating an unusually high order of activity in comparison to conventional aphicides.

EXAMPLE VIII

The chlorobenzyl compounds when tested in the foregoing manner were also shown to be highly effective, and gave the following results (1 gram of test chemical in 100 grams of benzene emulsion as described in Example VII):

|  | Percent Mortality | |
|---|---|---|
|  | M. pisi | A. fabae |
| para-chlorbenzyl-beta-thiocyano-ethylsulfide | 100 | 100 |
| 2,4-dichlorobenzyl-beta-thiocyano-ethylsulfide | 93 | 95 |
| 3,4-dichlorobenzyl-beta-thiocyano-ethylsulfide | 100 | 81 |

Graded dosages of para-chlorobenzyl-beta-thiocyanoethylsulfide produced the following results:

| Percent Concentration | Percent Mortality | |
|---|---|---|
|  | M. pisi | A. fabae |
| 1 | 100 | 100 |
| 0.5 | 100 | 100 |
| 0.3 | 95 | 100 |
| 0.25 | 100 | 100 |
| 0.16 | 90 | 80 |
| 0.11 | 45 | 73 |

This chemical is therefore unusually effective.

Similar results were obtained with the other chemicals of the invention. The chemicals will not destroy plants, when applied as described. The invention therefore makes it possible to control insects on plants and other places in a highly effective and efficient manner by economical chemicals that are readily synthesized and that have desirable qualities not found in previously known insecticides.

Having thus described our invention, what we claim and desire to protect by Letters Patent is:

1. A chlorobenzyl-beta-thiocyanoethylsulfide.
2. A monochlorobenzyl-beta-thiocyanoethylsulfide.
3. Parachlorobenzyl-beta-thiocyanoethylsulfide.
4. An insecticidal composition comprising a chlorobenzyl-beta-thiocyanoethylsulfide and a surface-active dispersing agent.
5. An insecticidal composition comprising parachlorobenzyl-beta-thiocyanoethylsulfide and a surface-active dispersing agent.

References Cited in the file of this patent

UNITED STATES PATENTS 2,572,946    Paulshock    Oct. 30, 1951

FOREIGN PATENTS 687,177    Great Britain    Feb. 11, 1953